Jan. 31, 1950

H. L. PHIPPEN 2,496,231

SURFACE ARTIFICIAL FISH LURE

Filed June 16, 1949

INVENTOR
HENRY L. PHIPPEN.

BY *[signature]*

ATTORNEYS.

Patented Jan. 31, 1950

2,496,231

UNITED STATES PATENT OFFICE 2,496,231

SURFACE ARTIFICIAL FISH LURE

Henry L. Phippen, East Detroit, Mich.

Application June 16, 1949, Serial No. 99,535

2 Claims. (Cl. 43—42.47)

This invention relates to a surface artificial fish lure.

The object of this invention is to produce an actuating plate which will be highly efficient when fishing.

Another object of this invention is the creation of a well balanced, streamlined body which has life-like resemblance of an enlarged insect, similar to that of the hornet.

A still further object of the invention is the construction of an actuating plate of comparatively light material, which plate can be permanently colored in various shades. This type of coloring is known as anodizing and is used on the actuating plate to increase its effectiveness; this treatment increases resistance to corrosion, staining, abrasion, and at the same time provides a hard surface of a most attractive color or configuration.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a top plan view of the body of a lure showing my improved actuating plate attached thereto, while

Figure 1:
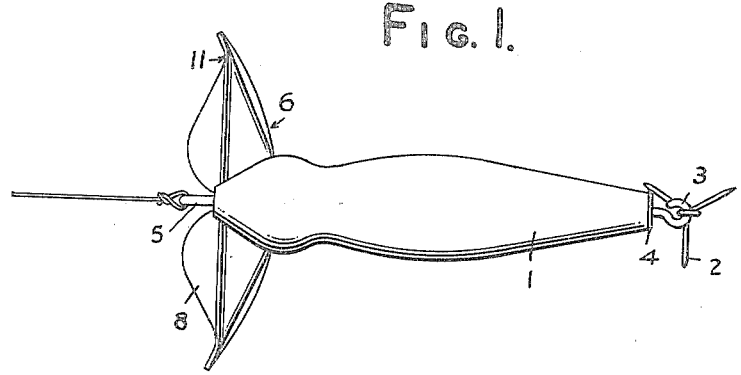

Referring to the drawings, in which the preferred embodiment of my invention is illustrated, 1 designates the body of the lure, which is provided with treble hooks 2 that are attached to the body 1 by eye screws 3. These eye screws 3 are inserted in small metal eyelets 4 that are countersunk in body 1, which prevents the hook barbs from scratching said body. One of these hooks 2 is mounted in the extreme tail end of said body 1 and the other is on the under side, as shown, just rear of the neckline. This type of construction allows the hooks to swing freely at any angle, preventing entanglement. A long eye screw 5 is attached to the nose of the body 1 for the purpose of fastening a line to the lure, whereby the lure can be pulled through the water and thereby giving maximum strength and eliminating any strain on the actuating plate 6. This arrangement positively attaches the line to the lure and enables the fisherman to handle a large fish on the line.

Figure 3:
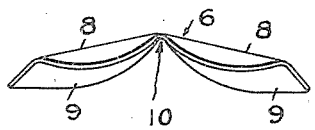
Figure 3 is a top plan view of the actuating plate.
Figure 5:
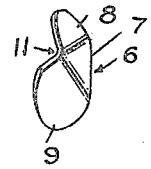
Figure 5 is an end view of the actuating plate.
Figure 4:
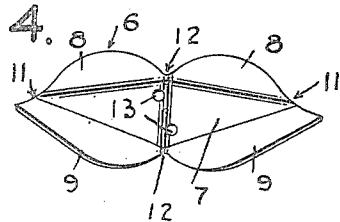
Figure 4 is a front view in elevation of the actuating plate.

The actuating plate 6 comprises a diamond-shaped, substantially flat portion 7, from which extends a pair of upper lips 8 and a pair of lower lips 9. The diamond-shaped portion 7 is bent rearwardly in a vertical plane at its center, forming a V-shaped portion, as will be seen upon referring to Figure 3. This V-shaped portion 10 constitutes a narrow, shallow channel. The upper lips 8 are narrower in width than the lower lips 9. The upper lips 8 extend to the ends of the diamond-shaped portion 7, whereas the lower lips 9 extend from the lower center of the vertical portion 10 beyond the extreme horizontal ends of the diamond-shaped portion 7. At the extreme outer ends of the diamond-shaped portion 7 are water relief openings 11. These openings 11 are very important, as they act similar to relief valves when the lure is in operation. The water relief openings 11 act as relief valves when one side of the actuating plate is in a rearward position. The rearward swing is known as the power stroke, whereas the forward swing is known as the relief stroke. When one side of the actuating plate is swung rearwardly and one side forward, the water relief space quickly relieves the water pressure on the rearward half, allowing the load to quickly shift to the forward half, resulting in real life-like action, which is attractive and liking to fish life.

There are two V-shaped openings 12 on the actuating plate 6. The upper V-shaped opening 12 is at the extreme upper portion of the vertical channel 10, also assists in building up and relieving the water pressure through the flowing of water through the upper horizontal channels on the forward and rearward swing of the actuating plate. The lower deep V-shaped opening 12 assists in building up and relieving water pressure through the flowing of water through the lower horizontal channels on the forward and rearward swing of the actuating plate.

Figure 2:
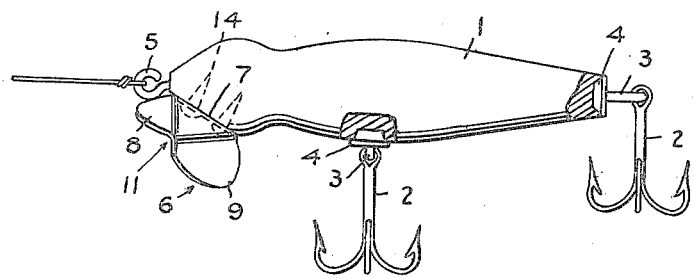
Figure 2 is a view in side elevation of the same.

The actuating plate 6 is provided with preferably two apertures 13 which receive screws or suitable fastening means 14 (dotted lines, Fig. 2) that extend into the body 1 and secure the actuating plate to said body.

While I have described the preferred embodiment of my invention and illustrated the same in the accompanying drawings, certain minor changes or alteration may appear to one skilled in the art to which this invention relates during the extensive manufacture of the same, and I, therefore, reserve the right to make such changes or alterations as shall fairly fall within the scope of the appended claims.

What I claim is:

1. An actuating plate for a fishing lure, comprising a diamond-shaped portion, said diamond-shaped portion provided with upper and lower lips, and said diamond-shaped portion provided at the outer ends of said lips with water relief spaces.

2. An actuating plate for a fishing lure, comprising a diamond-shaped central portion, said diamond-shaped central portion bent throughout its height, a pair of upper lips integral with said diamond-shaped central portion and extending to the outer ends of said diamond-shaped central portion, a pair of lower lips integral with said diamond-shaped central portion and having their outer ends extending beyond the outer ends of said diamond-shaped central portion, and said upper and lower lips forming at their inner ends substantially V-shaped, water relief openings.

HENRY L. PHIPPEN.

REFERENCES CITED

The following references are of record in the file of this patent:

UNITED STATES PATENTS

| Number | Name | Date |
|---|---|---|
| 1,615,803 | Pflueger | Jan. 25, 1927 |